(12) United States Patent
Dygert

(10) Patent No.: US 6,864,641 B2
(45) Date of Patent: Mar. 8, 2005

(54) METHOD AND APPARATUS FOR CONTROLLING LIGHT EMITTING DIODES

(75) Inventor: Gregory J. Dygert, Warren, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 37 days.

(21) Appl. No.: 10/370,968

(22) Filed: Feb. 20, 2003

(65) Prior Publication Data
US 2004/0164685 A1 Aug. 26, 2004

(51) Int. Cl.$^7$ .............................. H05B 37/02
(52) U.S. Cl. .................. 315/216; 315/194; 315/291
(58) Field of Search ................. 315/216, 194, 315/291, 185 R, 297, 300, 312, 315, 129, 247, 302

(56) References Cited

U.S. PATENT DOCUMENTS

| | | | | |
|---|---|---|---|---|
| 6,150,771 A | * | 11/2000 | Perry | 315/291 |
| 6,285,139 B1 | | 9/2001 | Ghanem | 315/291 |
| 6,346,777 B1 | * | 2/2002 | Kim | 315/185 S |
| 6,371,636 B1 | | 4/2002 | Wesson | 362/545 |
| 6,400,101 B1 | | 6/2002 | Biebl et al. | 315/291 |
| 6,515,434 B1 | | 2/2003 | Biebl | 315/291 |
| 6,621,235 B2 | * | 9/2003 | Chang | 315/216 |
| 2001/0033503 A1 | | 10/2001 | Hamp et al. | |
| 2001/0043113 A1 | | 11/2001 | Hoshino et al. | |
| 2002/0030455 A1 | | 3/2002 | Ghanem | |
| 2002/0084812 A1 | | 7/2002 | Nishitoba | |
| 2002/0135572 A1 | | 9/2002 | Weindorf | |
| 2002/0145392 A1 | * | 10/2002 | Hair et al. | 315/185 R |

* cited by examiner

Primary Examiner—Don Wong
Assistant Examiner—Chuc Tran
(74) Attorney, Agent, or Firm—Brinks Hofer gilson & Lione (57) ABSTRACT

A light emitting code ("LED") circuit includes a plurality of light emitting diodes connected in a hybrid parallel-series configuration, and a current regulating circuit that includes a current regulating element connected to a first chain of the plurality of chains of LEDS, and a plurality of current mirroring elements, each current mirroring element being connected to a respective chain of the plurality of chains of LEDs.

5 Claims, 6 Drawing Sheets

METHOD AND APPARATUS FOR CONTROLLING LIGHT EMITTING DIODES

BACKGROUND

1. Technical Field

The present invention relates generally to light emitting diodes, and more particularly relates to controlling a plurality of light emitting diodes.

2. Background Information

Light emitting diodes ("LEDs") are becoming increasingly popular as light source devices, especially as their cost continues to decrease. Typical applications for LEDs in automobiles include illumination of information display devices, such as liquid crystal diode displays, and illumination of gauges in instrument panel assemblies.

Typical applications utilize a plurality of LEDs to produce the required total light intensity. In general, the LEDs have a light intensity output that is adjustable over a wide range from full intensity to some small fraction of the full intensity, for example, 1/100 of the full intensity, in response to an operator or microcomputer command. The range of operating light intensity is commonly referred to as a dimming range or dimming ratio over which the light intensity from LED to LED remains substantially uniform, so that the total light intensity across the plurality of LEDs appears uniform. Since the perceived light intensity from an LED is proportional to its forward current, a uniform intensity requirement translates into a uniform current requirement. However, uniformity of current from LED to LED can be difficult to achieve in most circuits because of variations in supply and LED voltages and circuit impedances.

Both analog and digital methods have been used to adjust the average current through an LED, and, thus, light intensity of an LED. In the analog method, a voltage or current regulating device makes adjustments in a continuous manner so that the current varies from some maximum level to some minimum level within the required dimming range. In the digital method, commonly referred to as pulse width modulation ("PWM"), a voltage or current source adjusts between two levels (for example, between zero and maximum voltage or current) at a rate that is high enough to be perceived by human visual processes as an average intensity proportional to a duty ratio. Digital methods provide dimming over a wide range without the difficulties associated with regulating very low levels of current as in analog methods. Digital methods also allow operating at a level of current that is most efficient for the LED. In addition, since LED color characteristics are a function of current, operation at a specific current level assists in maintaining constant color over the dimming range. Further, digital methods are particularly suited to microcomputer interface and control.

In typical applications, the LEDs in an LED circuit are connected in either a parallel or series configuration. In the parallel configuration, the LEDs are connected in parallel, which in turn are connected to an adjustable supply voltage that is continuously variable for the analog case, or connected to a supply voltage that is supplied via switching techniques for the digital case. Varying the supply voltage in the analog case or using PWM in the digital case adjusts the current through the LEDs. However, it is difficult to maintain a precise and uniform level of current in each of the LEDs because of variations in supply and LED voltages and circuit resistance. In addition, the presence of resistance in the circuit adds to the total circuit power dissipation and reduces efficiency.

In a series configuration, all of the LEDs, a voltage supply, and/or a current limiting or current regulating device are connected in series. The LED current can then be adjusted with continuous voltage or current adjustment in the analog case or via PWM in the digital case. Use of the series configuration assures uniformity of current since all of the LEDs are connected in series and therefore conduct the same level of current. However, since all of the LEDs are connected in series, the failure of any one LED could lead to a total loss of illumination, which could be a safety issue in some applications.

BRIEF SUMMARY

In overcoming the above and other stated deficiencies, a light emitting diode ("LED") circuit is provided that includes a plurality of light emitting diodes connected in a hybrid parallel-series configuration, and a current regulating circuit that includes a current regulating element connected to a first chain of the plurality of chains of LEDS, and a plurality of current mirroring elements, each current mirroring element being connected to a respective chain of the plurality of chains of LEDs.

The LED circuit may offer one or more advantages over other technologies (such as fluorescent lamps) in terms of costs, performance, circuit complexity, useful life, electromagnetic interference, mechanical robustness, manufacturing and/or the absence of toxic mercury.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

The drawings that will now be briefly described are incorporated herein to illustrate preferred embodiments of the invention. The components in the figures are not necessarily to scale, emphasis instead being placed upon illustrating the principles of the invention. Moreover, in the figures, like reference numerals designate corresponding parts through the different views. In the drawings.

DETAILED DESCRIPTION

The following discussion presents a light emitting diode circuit for controlling a plurality of light emitting diodes ("LEDs"). The circuit maximizes uniformity of current in the LEDs, dimming range, and efficiency, while minimizing costs, power dissipation, and electromagnetic interference ("EMI").

Figure 1:
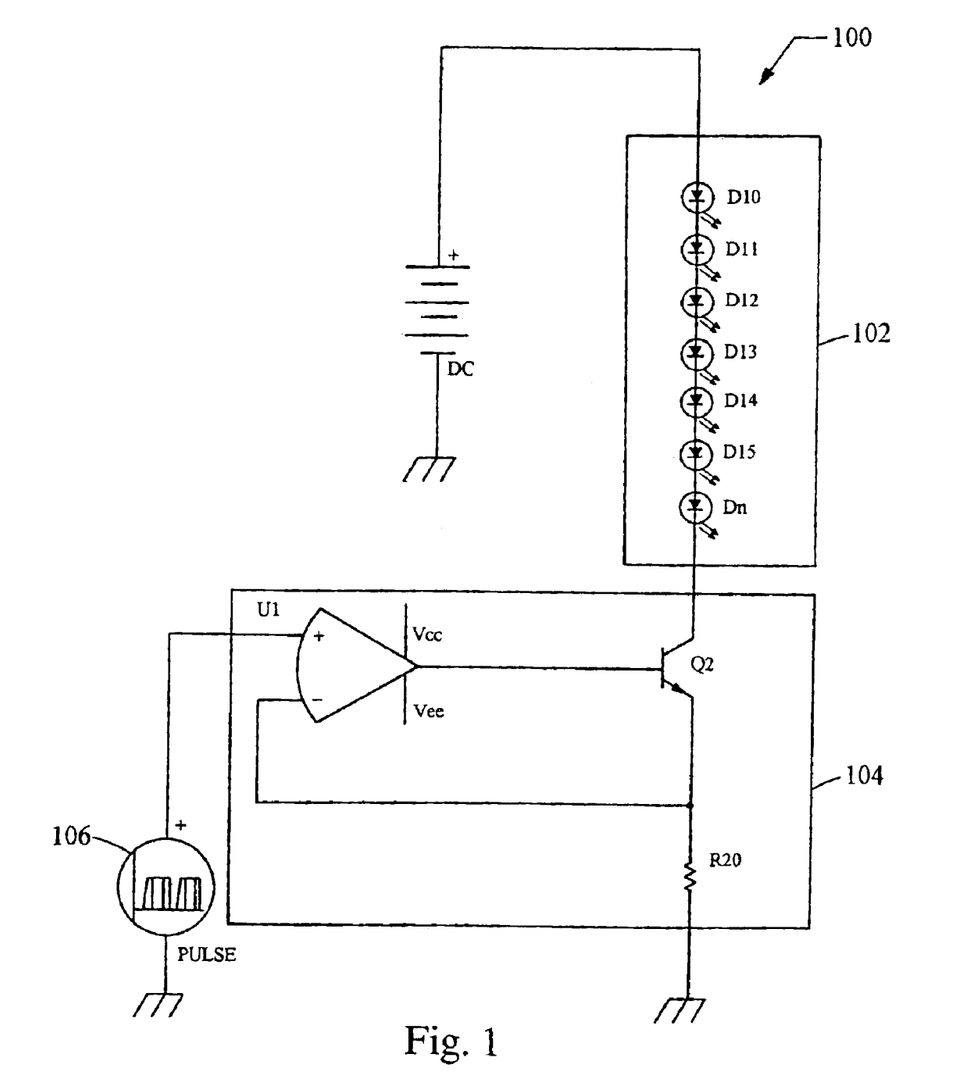
FIG. 1 is a circuit diagram of a light emitting diode circuit with a single chain of light emitting diodes connected in series.

Although the invention is generally directed to an LED circuit with a hybrid parallel-series configuration, for purposes of illustration, the discussion begins with FIG. 1 illustrating a basic LED circuit 100. The LED circuit 100 includes a fixed voltage source DC, for example, a supply of 15 volts, connected in series with an array of LEDs 102 and a current regulating circuit 104. The fixed voltage source DC is dimensioned in accordance with the expected highest LED chain voltage to maintain the required current conduction though the LEDs. With a fixed voltage supply, the current regulating circuit 104 is dimensioned for power according to the expected lowest LED chain voltage and highest LED current.

The LED array 102 includes a plurality of LEDs D10, D11, D12, D13, D14, D15, and Dn connected in series. The LEDs may be white or colored LEDs, such as red, green, and blue LEDs, other colored LEDs, or a combination of different types of LEDs. The LED labeled "Dn" represents the nth LED, where n is the total number of diodes in the series array. While FIG. 1 illustrates only seven LEDs in the LED array 102, the LED array 102 may have any number of LEDs.

The current regulating circuit 104 includes an operational amplifier U1, a current regulating transistor (hereinafter, an NPN transistor referred to as a current regulating element) Q2, and a resistor R20. The anode terminal of the LED D10 is connected to the direct current voltage source DC, while the cathode terminal of the LED Dn is connected to the collector terminal of the current regulating transistor Q2. The operational amplifier is connected to an input node 106, which may receive an input signal from a microprocessor or other controller. The signal may be a DC voltage signal, or other type of signal, or, as shown, the input signal can be a pulse width modulated ("PWM") signal, such that the LED circuit 100 operates in a digital mode. A PWM input signal controls the intensity of the LED based on the duty ratio and/or the voltage level of the input signal. Generally, as the duty ratio of the input signal increases, the LEDs D10 through Dn become brighter.

In response to the PWM control signal from the input node 106, as well as the emitter current of the element Q2 that has been converted to a voltage by the resistor R20 fed back to the operational amplifier U1, the current regulating circuit 104 regulates the transistor collector current of the current regulating element Q2, and hence the LED array 102 current, by controlling the base current of the element Q2. In this manner, the collector current of the current regulating element Q2 switches between approximately zero current and a level of current at a duty ratio determined primarily by the PWM control signal. Thus, the average current, and therefore the light intensity of the LEDs will be a direct function of the duty ratio despite variations of the LED and supply voltages.

Figure 2:
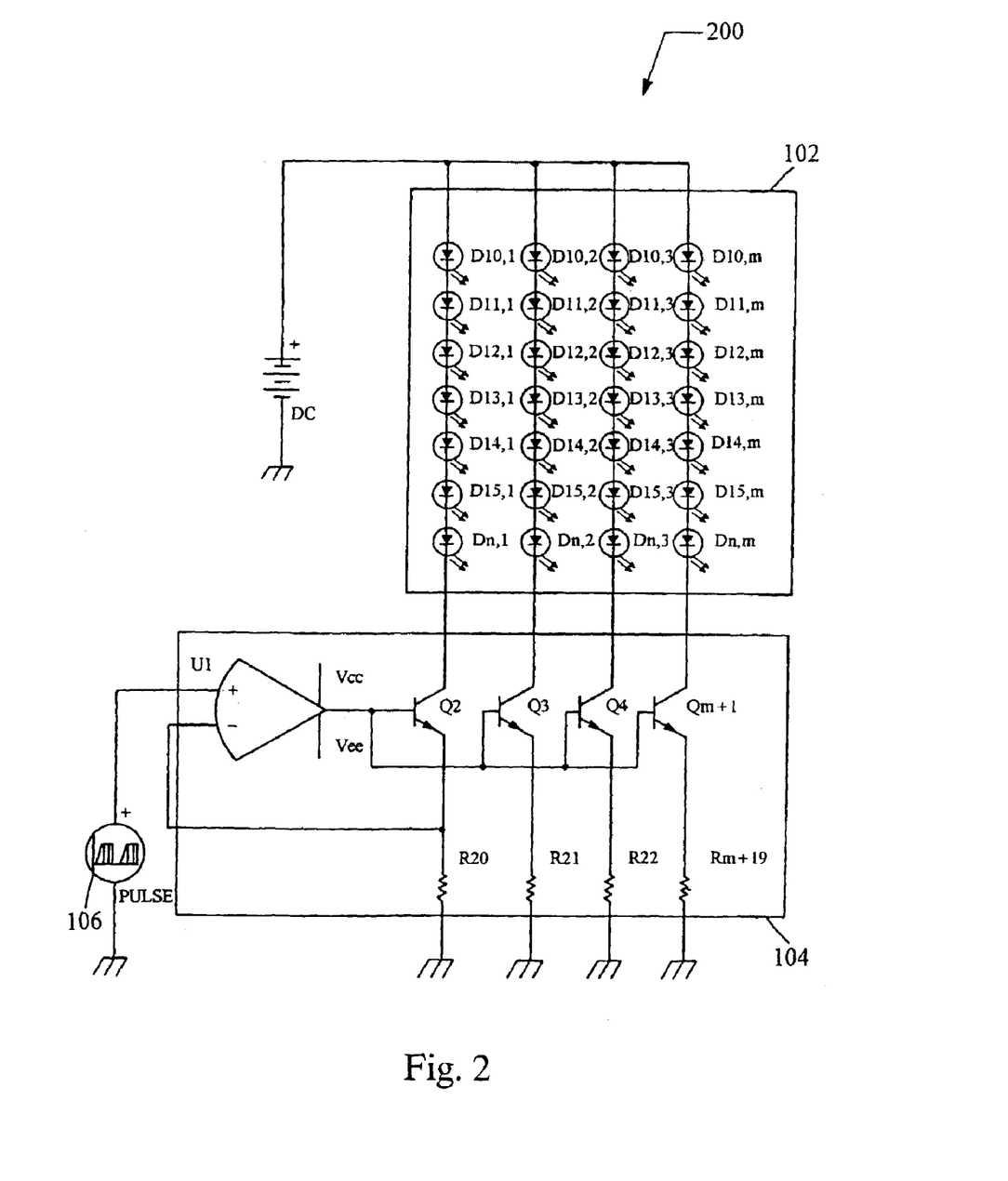
FIG. 2 is a circuit diagram of a light emitting diode circuit with multiple chains of the light emitting diodes connected to current regulating/mirroring ("CRM") elements.

By considering the LED array 102 of FIG. 1 as a single chain, the circuit 100 can be expanded to include multiple chains of LEDs by utilizing current mirroring techniques. For example, as shown in FIG. 2, a circuit 200 includes the array 102 that has been expanded to include the chains 1 through m so that the array 102 now includes the light emitting diodes Di,j, where i=10, 11, . . . , n identifies the particular diode in a single chain and j=1, 2, 3, . . . , m identifies the particular chain. Accordingly, the LEDs D10,1 through Dn,1 are identical to those shown in FIG. 1., which are connected in parallel with the other chains, 2, 3, . . . , m, of LEDs. Like n, m can be any number and does not have to equal n.

As shown, the current regulating circuit 104 is expanded as well, so that each additional chain of LEDs is connected in series with a respective current mirroring element Q3 through Qm+1 and an associated resistor R21 through Rm+19. However, like the circuit 100, the current regulating circuit 104 of the circuit 200 includes only a single operational amplifier U1. Hence, current mirroring maximizes uniformity of current from chain to chain without duplicating the entire regulating circuitry, thus minimizing cost. The current mirroring technique operates on the principle that if two or more identical bipolar junction transistors (BJTs), such as the current regulating element Q2 and current mirroring elements Q3, Q4, and Qm+1, are operated with identical base-emitter voltages, then, to a first approximation, they will conduct identical collector currents. Typically, the BJTs are matched with consideration to properties, operating temperature, and external circuit impedance in order to maximize uniformity of collector currents.

The circuit of FIG. 2 can be expanded further to include monitoring/regulating circuitry to monitor the voltage drop across each of the current regulating/mirroring ("CRM") elements Q2, Q3, Q4, and Qm+1, and to regulate the voltage supplied to the LED array 102 based on these measurements. The voltage drop across a conducting CRM element is an indication of the voltage required by its associated LED chain, since any portion of the supply voltage that is in excess of LED requirements will appear across the CRM element. In addition, the voltage drop across a conducting CRM is also an indication of the power dissipation associated with that element.

Figure 3:
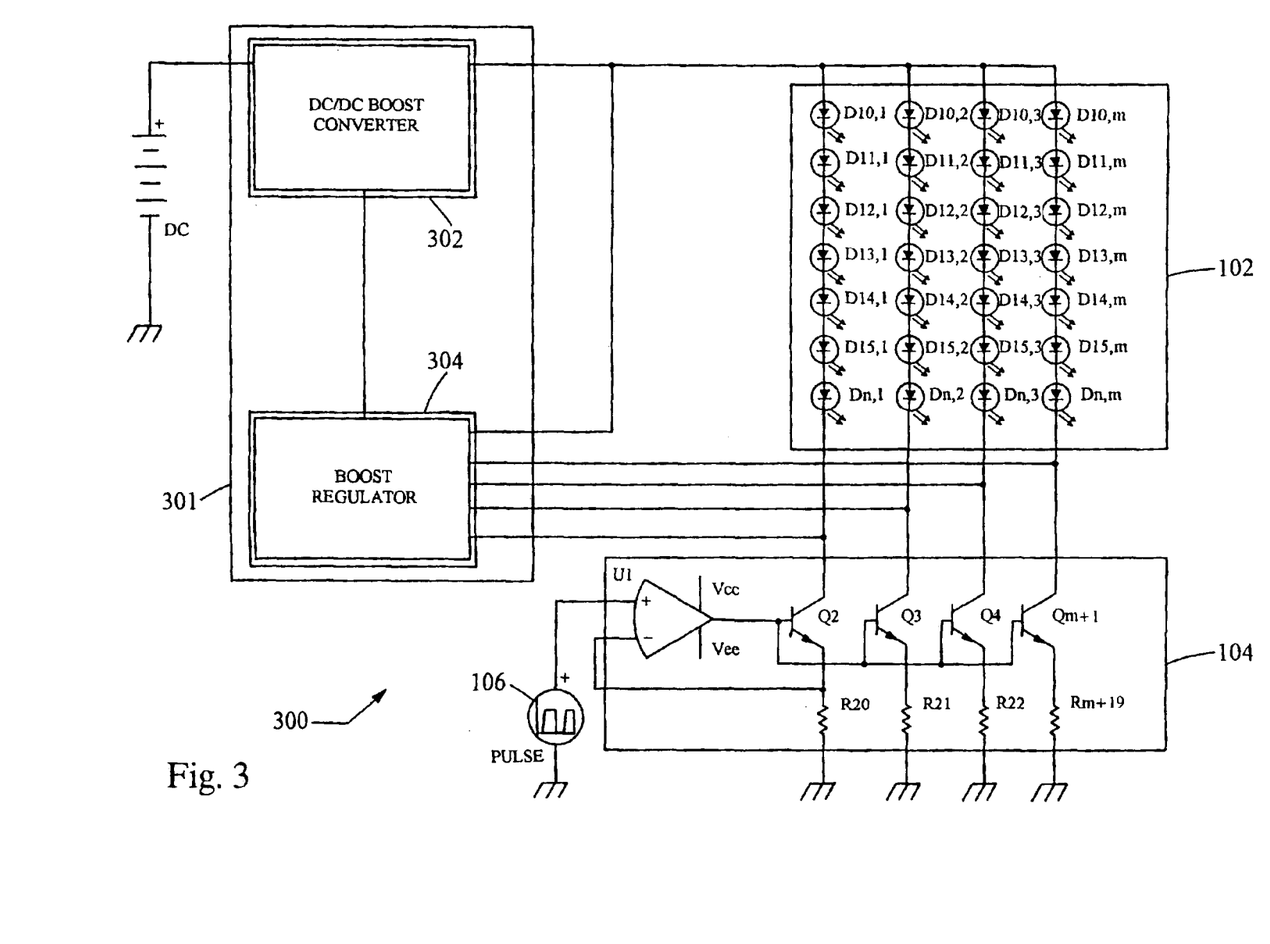
FIG. 3 is a circuit diagram of the light emitting circuit of FIG. 2 with a monitoring/regulating circuit in accordance with the invention.

FIG. 3 illustrates an LED circuit 300 including such a monitoring/regulating circuit, designated at 301, that includes a boost converter 302 and a boost regulator 304.

If the boost regulator 304 detects a voltage drop across any CRM element Q2, Q3, Q4, and Qm+1 that is too low, indicating that a CRM element is approaching saturation, the boost regulator 304 signals the boost converter to boost the voltage to the array of LEDs 102 thereby providing the required level of current to the LEDs. Moreover, if the regulator 304 detects that any CRM voltage drop is too high, indicating that the associated power dissipation is excessive, the regulator 304 signals the converter 302 to lower the supply voltage. Hence, unlike the circuits 100 (FIG. 1) and 200 (FIG. 2) the voltage supply to the LED array 102 is regulated rather than being fixed. Accordingly, the voltage supply, DC, and the current regulating circuit 104 do not have to be dimensioned for worst-case operating conditions unlike the circuits 100 and 200.

Figure 4:
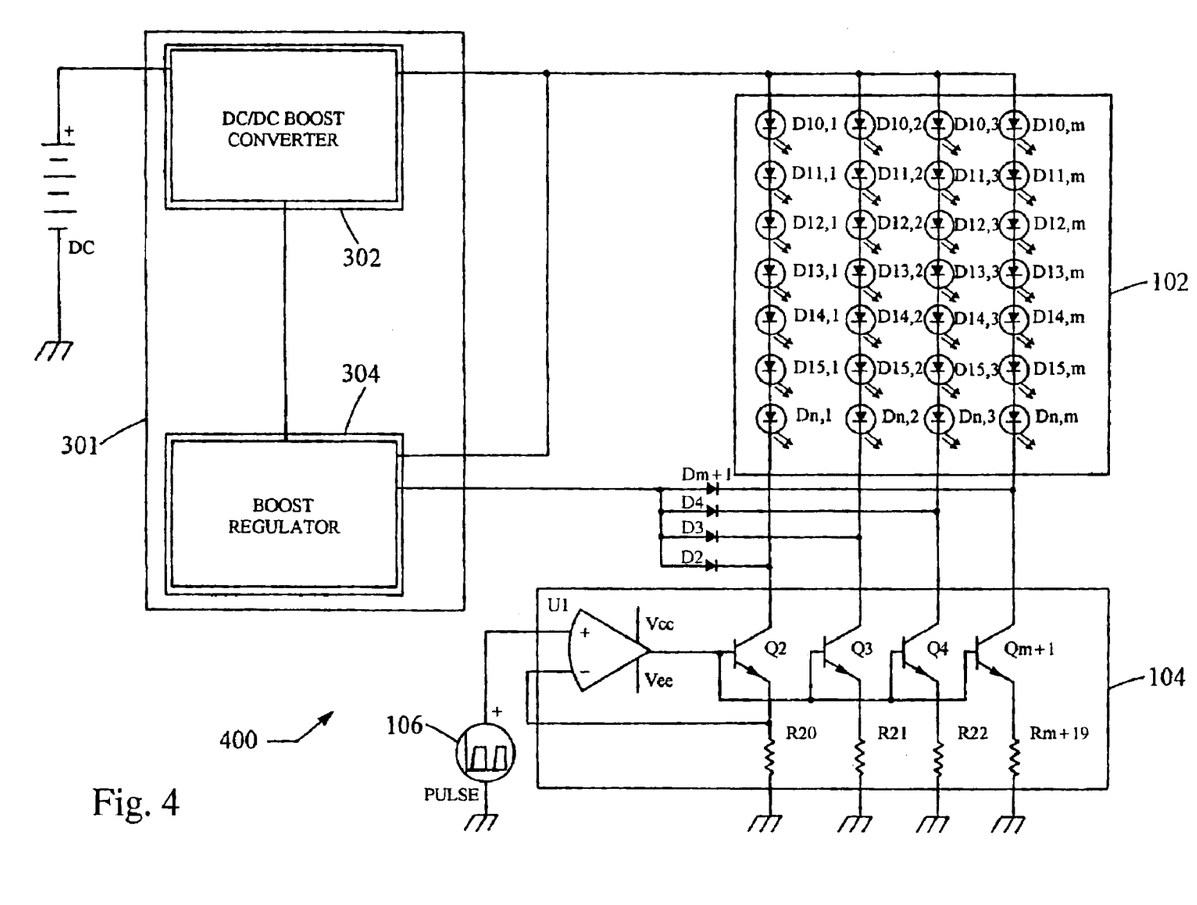
FIG. 4 is a circuit diagram of the circuit of FIG. 3 with a set of diodes connected to respective CRM elements in accordance with the invention.

Referring to FIG. 4, there is shown a circuit 400 which is similar to the circuit 300, but employs diodes D2, D3, D4, and Dm+1 associated with the CRM elements Q2, Q3, Q4, and Qm+1, respectively, to allow measurement of the lowest CRM voltage drop with a minimum amount of circuitry. Of course, if the diodes D2, D3, D4, and Dm+1 are arranged in the opposite direction, then the highest CRM voltage drop can be measured. In either case, only a single connection is required to connect the current regulating circuit 104 to the boost regulator 304. (In comparison, m such connections are required in the circuit 300 of FIG. 3.) In the circuit 400, the CRM element Q2, Q3, Q4, and Qm+1 with the lowest voltage drop forward biases its associated diode D2, D3, D4, or DM+1, which affects the feedback of the boost regulator 304 to the boost converter 302 so that the voltage supply to the LED array 102 is maintained at the appropriate level.

Note that rather than measuring the voltage drops across the CRM elements Q2, Q3, Q4, and Qm+1 to control the voltage supply to the LED array 102, other techniques can be used to measure the voltage drop or drops across the LED chains, 1, 2, 3, and m, directly. Furthermore, if circuitry is included to measure temperature in the vicinity of the CRM elements Q2, Q3, Q4, and Qm+1, then the temperature measurement can be used in conjunction with the CRM power dissipation measurements, as described above, to manage the temperatures of the CRM elements Q2, Q3, Q4, and Qm+1 by adjusting the supply voltage and/or PWM adjustment. The uses of these techniques may facilitate the use of smaller and less costly electronic devices, since they need not be dimensioned for worst-case operating conditions. In addition, these techniques may provide for a way of detecting fault conditions.

Figure 5A:
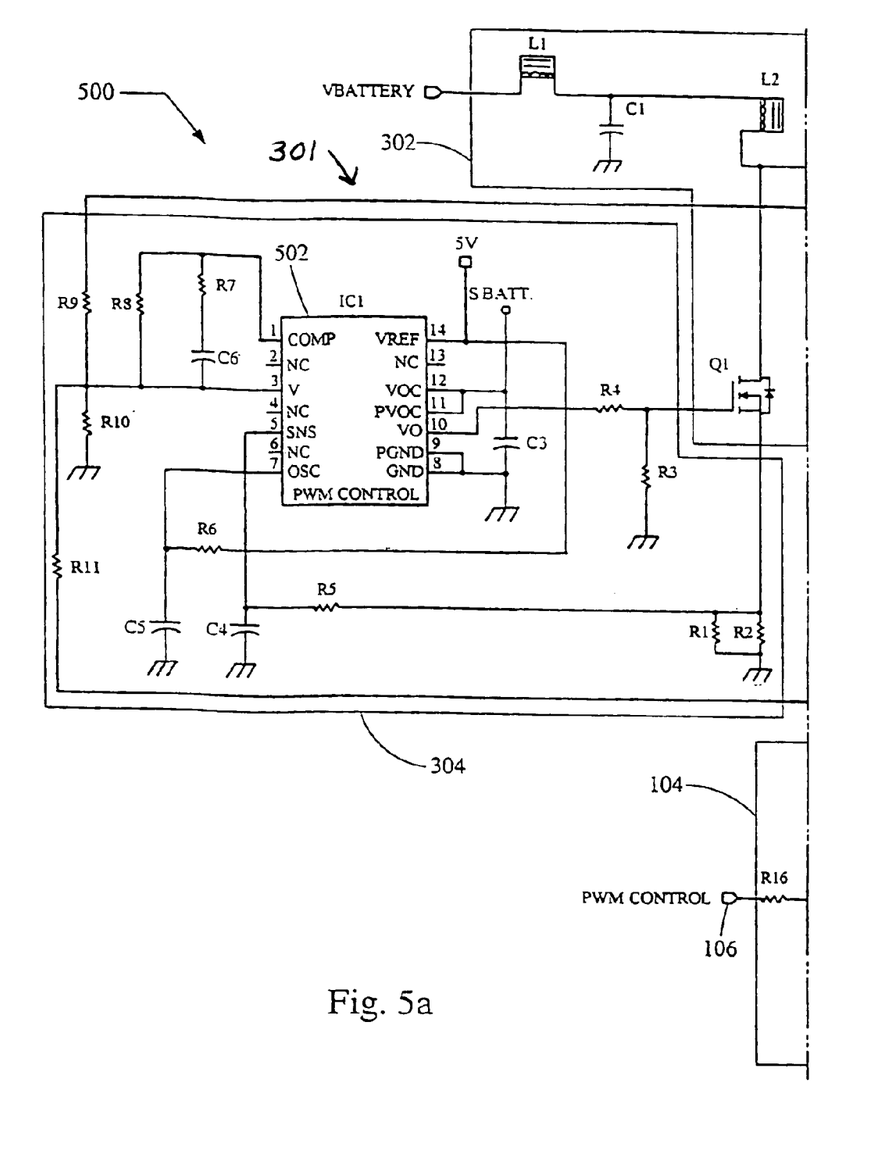
FIGS. 5a and 5b are partial circuit diagrams of the circuit of FIG. 4 in an automotive instrument cluster.
Figure 5B:
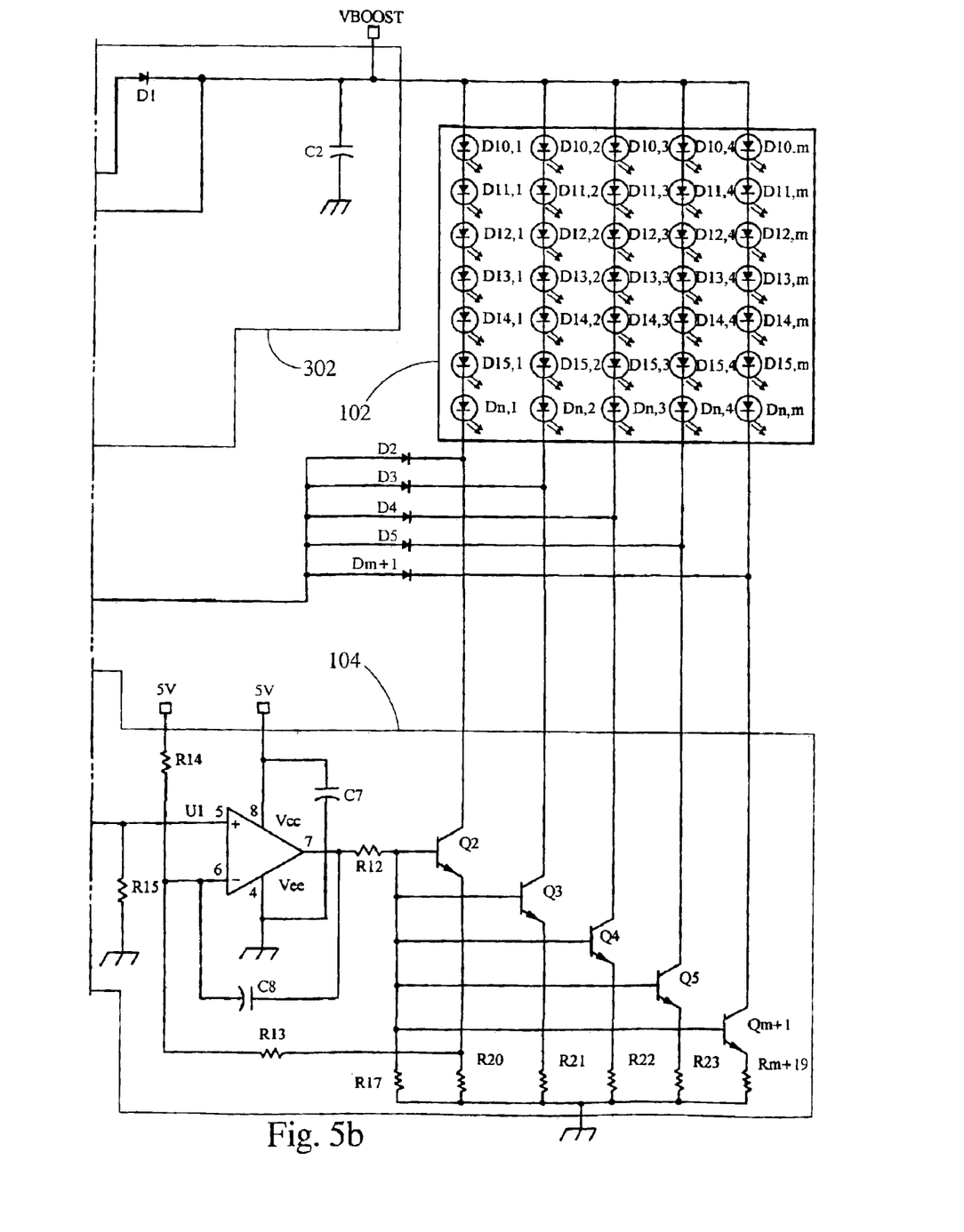

FIG. 5, being the composite of FIG. 5a and FIG. 5b, illustrates a particular implementation of the circuit 400 (FIG. 4) in an automotive instrument cluster circuit 500. The array of LEDs 102 in the circuit 500 is arranged in parallel chains so that the composite LED voltages are compatible with common automotive grade electronic devices.

The boost regulator 304 includes a PWM control IC identified as IC1. The control IC1 regulates the boost supply output voltage of the boost converter 302 by regulating a scaled version of the boost output voltage (feed back voltage), which is derived from a resistor/divider network R9 and R10. The control IC IC1 uses the difference between the feedback voltage and an internal reference to regulate the output voltage utilizing PWM techniques.

As discussed above, the current regulating circuit 104 regulates the transistor collector current of the CRM elements Q2 through Qm+1 (and thus the associated LED chain current) by controlling the base current of the CRM elements Q2 through Qm+1 in accordance with the PWM control signal from the input 106 and the emitter current from the CRM elements Q2 through Qm+1. Hence, the collector current of each of the CRM elements Q2 through Qm+1 switches between approximately zero current and a level of current determined primarily by the PWM control signal.

Utilizing the current mirroring concept, the base terminal of the current regulating element Q2 is connected to the base terminals of similar current mirroring elements Q3, Q4, Q5, and Qm+1 associated with the respective remaining parallel LED chains. Thus, each of the CRM elements Q2, Q3, Q4, Q5, and Qm+1 shares essentially the same base-emitter voltage, and therefore conducts substantially uniform collector currents. Using identical transistors for the CRM elements integrated into the same mounting package maximizes uniformity of the collector currents.

The collector terminals and the emitter terminals of the CRM elements Q2, Q3, Q4, Q5, and Qm+1 are connected to similar collector and emitter circuits. In particular, the collector terminal of each CRM element Q2, Q3, Q4, Q5, and Qm+1 is connected, respectively, to the cathode terminal of diodes D2, D3, D4, D5, and Dm+1. The anode terminals of these diodes D2, D3, D4, D5, and Dm+1 are connected together and in turn to a resistor R11 of an appropriate value. The other side of the transistor R11 is connected to the feedback resistor divider network R9 and R10. Similar to the configuration of FIG. 4, the diode D2, D3, D4, D5, or Dm+1 with the lowest cathode voltage will alter the feedback of the boost regulator 304, and thus the output voltage level of the boost converter 302 in accordance with the lowest CRM collector voltage. Since all of the LEDs in the array 102 are typically the same type, and therefore operate at substantially similar temperatures, the CRM collector voltages should be substantially uniform. Therefore, by adjusting the supply voltage so that the CRM with the lowest collector voltage is not saturated insures that an adequate voltage drives the remaining chains of LEDs. Furthermore, since the boost voltage from the boost converter 302 is dynamically adjusted so that the CRM voltage drops are minimized, power dissipation is reduced as compared to a fixed voltage supply that is dimensioned for the worst-case LED chain voltage such as the circuits 100 (FIG. 1) and 200 (FIG. 2). The reduced power dissipation reduces the operating temperature of the circuit components, which allows the use of smaller, less expensive components, increases the allowable operating current and thus light intensity of the LEDs, and extends the useful life of circuit components.

In sum, the light emitting diode circuit 500 has a hybrid parallel-series configuration. The parallel connections limit circuit voltages to reasonable levels consistent with automotive grade electronic components, safety requirements, EMI and low cost. In addition, the parallel connections minimize the probability of a total loss of illumination due to the failure of one or more LEDs. The series connections maximize uniformity of current within each series chain and minimize the number of current regulating elements and the associated cost and power dissipation. Current regulation provides precise control of current and intensity despite variations in source and LED voltages. Current mirroring techniques, utilized in conjunction with current regulation, maximize uniformity of current across parallel chains with a minimum of circuitry. Digital (for example, PWM) control is utilized to achieve a wide range of operating light intensity (i.e. dimming range) and simplified microcomputer control and interfacing. The PWM method, applied in conjunction with current regulating/mirroring techniques, maximizes LED efficiency and color consistency. Finally, the supply voltage is dynamically adjusted in accordance with LED requirements to minimize the power dissipation associated with the current regulating/mirroring elements. To accomplish this, the voltage across each CRM element is measured and the supply voltage is adjusted according to LED voltage and power dissipation requirement.

The LED circuit 500 of FIG. 5 may include components as indicated in Table 1. Other types of components and components of different values may also be used in the LED circuit 500 as will be apparent to one of skill in the art.

TABLE 1

| Reference | Description |
| --- | --- |
| C1 | A capacitor, for example, a 220 $\mu$F capacitor. |
| C2 | A capacitor, for example, a 100 $\mu$F capacitor. |
| C3 | A capacitor, for example, a 10 nF capacitor. |
| C4 | A capacitor, for example, a 1 nF capacitor. |
| C5 | A capacitor, for example, a 47 nF capacitor. |
| C6 | A capacitor, for example, a 220 nF capacitor. |
| C7 | A capacitor, for example, a 10 nF capacitor. |
| C8 | A capacitor, for example, a 1 nF capacitor. |
| D1 | A diode, for example, a model MURS 120 from On Semiconductor. |
| D2-Dm + 1 | A diode, for example, a model BAS21 from On Semiconductor. |
| D10, 1 – Dn, m | A light emitting diode, for example, a model LWE 67C from Osram. |
| IC1 | A PWM controller, for example, a CS2841 from On Semiconductor. |
| L1 and L2 | An inductor, for example, a 170 $\mu$H inductor. |
| Q1 | A MOSFET, for example, a model IRFZ24NS from International Rectifier. |
| Q2-Qm + 1 | An NPN transistor, for example, a model MPSA06 from On Semiconductor |

TABLE 1-continued

| Reference | Description |
|---|---|
| U1 | An operational amplifier, for example, a model LM2904D from National Semiconductor. |
| R1–R2 | A resistor, for example, a 1 Ω resistor. |
| R3 | A resistor, for example, a 30 kΩ resistor |
| R4 | A resistor, for example, a 1.5 kΩ resistor. |
| R5 | A resistor, for example, a 1 kΩ resistor. |
| R6 | A resistor, for example, a 1.27 kΩ resistor. |
| R7 | A resistor, for example, a 30 kΩ resistor. |
| R8 | A resistor, for example, a 1 MΩ resistor. |
| R9 | A resistor, for example, a 22.1 kΩ resistor. |
| R10 | A resistor, for example, a 28 kΩ resistor. |
| R11 | A resistor, for example, a 4.75 kΩ resistor. |
| R12 | A resistor, for example, a 1.5 kΩ resistor. |
| R13 | A resistor, for example, a 1.05 kΩ resistor. |
| R14 | A resistor, for example, a 280 kΩ resistor. |
| R15 | A resistor, for example, a 1.05 kΩ resistor. |
| R16 | A resistor, for example, a 22.1 kΩ resistor. |
| R17 | A resistor, for example, a 30 kΩ resistor. |
| R20-Rm + 19 | A resistor, for example, a 10 Ω resistor. |

It is therefore intended that the foregoing detailed description be regarded as illustrative rather than limiting, and that it be understood that it is the following claims, including all equivalents, that are intended to define the spirit and scope of this invention.

I claim:

1. A light emitting diode ("LED") circuit, comprising:
a first chain of LEDs connected in series;
a plurality of chains of LEDs connected in parallel with the first chain of LEDs, each chain of the plurality of chains of LEDs including a plurality of LEDs connected in series; and
a current regulating circuit including a current regulating element connected to the first chain of LEDS, the current regulating circuit further including a plurality of current mirroring elements, each current mirroring element being connected to a respective chain of the plurality of chains of LEDs.

2. The LED circuit of claim 1, wherein the current regulating circuit maintains uniform current in the chains of LEDs as a direct function of the level and duty ratio of a control signal supplied to the current regulating circuit.

3. The LED circuit of claim 2, wherein the control signal is a pulse width modulated ("PWM") signal.

4. The LED circuit of claim 1, further comprising a monitoring/regulating circuit connected to the plurality of chains of LEDs and the current regulating circuit, the monitoring/regulating circuit monitoring the voltage drop across the current regulating and mirroring ("CRM") elements, or across the chains of LEDs, and adjusting a supply voltage to the plurality of chains of LEDs based on the monitored voltage drops.

5. The LED circuit of claim 4, wherein the monitoring/regulating circuit includes a boost regulator and a boost converter, the boost regulator monitoring the voltage drop across the CRM elements, or across the chains of LEDs, and providing a feedback signal to the converter, the converter adjusting the supply voltage to the chains of LEDs in response to the feedback signal.

* * * * *

UNITED STATES PATENT AND TRADEMARK OFFICE
CERTIFICATE OF CORRECTION

PATENT NO. : 6,864,641 B2
DATED : March 8, 2005
INVENTOR(S) : Gregory J. Dygert

It is certified that error appears in the above-identified patent and that said Letters Patent is hereby corrected as shown below:

<u>Title page,</u>
Item [57], ABSTRACT,
Line 1, after "emitting" delete "code" and substitute -- diode -- in its place.

Signed and Sealed this

First Day of November, 2005

JON W. DUDAS
*Director of the United States Patent and Trademark Office*